(12) United States Patent
Bax

(10) Patent No.: US 10,685,049 B2
(45) Date of Patent: Jun. 16, 2020

(54) CONVERSATION SUMMARY

(71) Applicant: Yahoo Holdings, Inc., Sunnyvale, CA (US)

(72) Inventor: Eric Theodore Bax, Sierra Madre, CA (US)

(73) Assignee: Oath Inc., New York, NY (US)

( * ) Notice: Subject to any disclaimer, the term of this patent is extended or adjusted under 35 U.S.C. 154(b) by 282 days.

(21) Appl. No.: 15/705,478

(22) Filed: Sep. 15, 2017

(65) Prior Publication Data

US 2019/0087491 A1    Mar. 21, 2019

(51) Int. Cl.
| | |
|---|---|
| G06F 16/34 | (2019.01) |
| H04W 4/08 | (2009.01) |
| H04L 12/58 | (2006.01) |
| G06T 11/60 | (2006.01) |
| G10L 13/04 | (2013.01) |
| G06Q 50/00 | (2012.01) |
| H04L 29/08 | (2006.01) |
| H04L 12/18 | (2006.01) |
| G06Q 10/10 | (2012.01) |
| G10L 13/02 | (2013.01) |
| G10L 17/00 | (2013.01) |

(52) U.S. Cl.
CPC ......... *G06F 16/345* (2019.01); *G06Q 10/107* (2013.01); *G06Q 50/01* (2013.01); *G06T 11/60* (2013.01); *G10L 13/02* (2013.01); *G10L 13/043* (2013.01); *G10L 17/00* (2013.01); *H04L 12/1813* (2013.01); *H04L 29/08684* (2013.01); *H04L 51/043* (2013.01); *H04L 51/063* (2013.01); *H04L 51/066* (2013.01); *H04L 51/16* (2013.01); *H04L 51/32* (2013.01); *H04L 67/24* (2013.01); *H04W 4/08* (2013.01)

(58) Field of Classification Search
CPC ............... H04L 12/1813; H04L 41/026; H04L 51/00–04; H04L 51/063; H04L 51/066; H04L 51/16; H04L 51/32; H04L 29/08684; H04L 51/043; H04L 67/24; G06F 16/3344; G06F 16/345; G06F 17/20–24; G06F 17/2785; G06Q 10/107; G06Q 10/10; G06Q 50/01; G10L 13/00–02; G10L 17/00; G10L 13/043
See application file for complete search history.

(56) References Cited

U.S. PATENT DOCUMENTS

| | | | | |
|---|---|---|---|---|
| 7,260,607 B2 * | 8/2007 | Aktas | ...................... | H04L 51/36 379/88.11 |
| 7,313,617 B2 * | 12/2007 | Malik | ...................... | G06F 21/62 709/225 |

(Continued)

*Primary Examiner* — Brendan Y Higa
(74) *Attorney, Agent, or Firm* — Cooper Legal Group, LLC

(57) ABSTRACT

One or more computing devices, systems, and/or methods for summarization of a conversation are provided. For example, a first message of the conversation may be received from a first user and a second message of the conversation may be received from a second user. In response to a user request by a third user or a determination that the third user did not view the first message and the second message, a device, such as a server and/or a client device of the user, may analyze a plurality of messages comprising the first message and the second message to generate a summary based upon the plurality of messages. The device may present the summary to the third user.

20 Claims, 9 Drawing Sheets

(56) References Cited

U.S. PATENT DOCUMENTS

| | | | | |
|---|---|---|---|---|
| 9,558,165 B1* | 1/2017 | Marsten | G06F 17/24 |
| 10,224,025 B2* | 3/2019 | Liu | H04L 51/32 |
| 10,277,548 B2* | 4/2019 | Zheng | H04L 12/1827 |
| 10,389,662 B2* | 8/2019 | Chudge | H04L 12/1813 |
| 2002/0136279 A1* | 9/2002 | Al-Kazily | G06F 16/958 |
| | | | 375/150 |
| 2003/0110450 A1* | 6/2003 | Sakai | G06F 17/214 |
| | | | 715/256 |
| 2005/0267870 A1* | 12/2005 | Everett-Church | H04L 51/04 |
| 2006/0161542 A1* | 7/2006 | Cucerzan | G06F 16/338 |
| 2007/0168863 A1* | 7/2007 | Blattner | G06F 3/011 |
| | | | 715/706 |
| 2007/0271376 A1* | 11/2007 | Yach | G06Q 10/107 |
| | | | 709/224 |
| 2008/0307322 A1* | 12/2008 | Stochosky | G06F 3/0481 |
| | | | 715/752 |
| 2009/0024393 A1* | 1/2009 | Kaneyasu | G10L 13/033 |
| | | | 704/260 |
| 2009/0048838 A1* | 2/2009 | Campbell | G10L 13/033 |
| | | | 704/254 |
| 2009/0265307 A1* | 10/2009 | Reisman | G06F 16/954 |
| 2011/0060983 A1* | 3/2011 | Cai | G06F 16/9562 |
| | | | 715/254 |
| 2011/0314041 A1* | 12/2011 | Drucker | G06Q 30/02 |
| | | | 707/769 |
| 2012/0143972 A1* | 6/2012 | Malik | H04L 51/36 |
| | | | 709/206 |
| 2012/0148034 A1* | 6/2012 | Ferguson | H04M 1/7255 |
| | | | 379/88.14 |
| 2013/0268839 A1* | 10/2013 | Lefebvre | G06Q 10/107 |
| | | | 715/234 |
| 2013/0287187 A1* | 10/2013 | Gandhe | H04M 3/42042 |
| | | | 379/93.17 |
| 2014/0012927 A1* | 1/2014 | Gertzfield | G06Q 50/01 |
| | | | 709/206 |
| 2014/0067375 A1* | 3/2014 | Wooters | G06F 17/279 |
| | | | 704/9 |
| 2015/0121200 A1* | 4/2015 | Hamada | G06F 16/345 |
| | | | 715/243 |
| 2015/0215241 A1* | 7/2015 | Zhou | H04L 51/16 |
| | | | 709/206 |
| 2015/0269153 A1* | 9/2015 | Fink | G06F 16/24578 |
| | | | 707/750 |
| 2016/0127280 A1* | 5/2016 | Nair | H04L 67/306 |
| | | | 709/206 |
| 2016/0212024 A1* | 7/2016 | Abou Mahmoud | H04L 43/045 |
| 2017/0171121 A1* | 6/2017 | Zhang | H04L 51/04 |
| 2017/0359393 A1* | 12/2017 | Rajagopal | H04L 65/403 |
| 2018/0034756 A1* | 2/2018 | Allen | H04L 51/04 |

* cited by examiner

CONVERSATION SUMMARY

BACKGROUND

Many services, such as instant messaging services, email services, social networks and apps may allow a user to create an account capable of sending and receiving messages in a group conversation, such as a group chat using an app, a group chat using an instant message service, a group chat using a text message service, a group chat using a social network or an email stream. The user may not have time to keep up with and view/read all the messages in the group conversation.

SUMMARY

In accordance with the present disclosure, one or more computing devices and/or methods for summarization of a conversation are provided. In an example, a first message may be received, in a conversation (e.g., such as a group chat using an app, a group chat using an instant message service, a group chat using a text message service, a group chat using a social network or an email stream), from a first user. A second message may be received, in the conversation, from a second user. A summary may be generated based upon the first message and the second message (e.g., responsive to a user request by a third user or a determination that the third user did not view the first message and the second message). The summary may be presented to the third user (e.g., in such a way that the user may have an understanding of the first message and the second message).

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
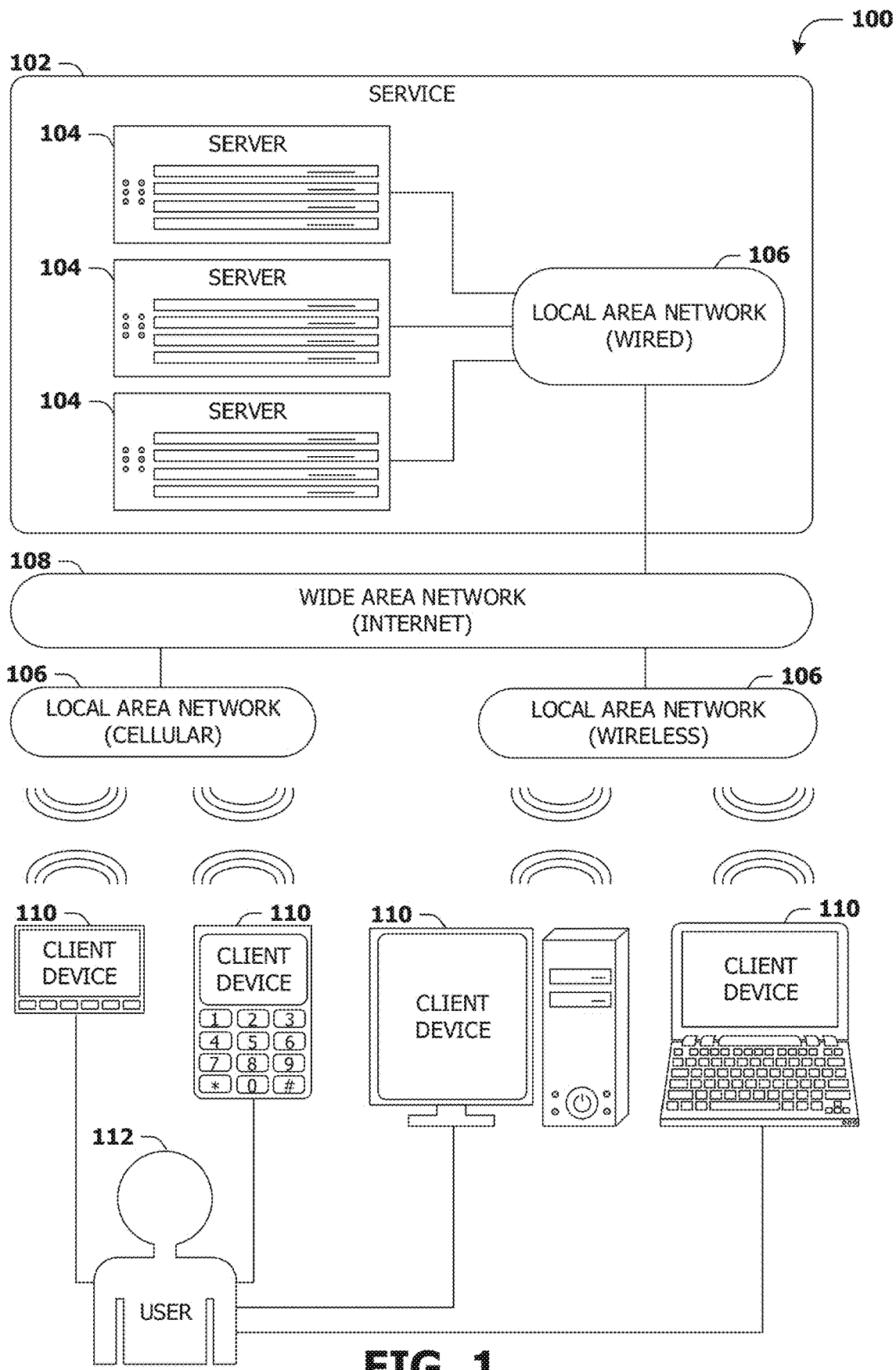
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
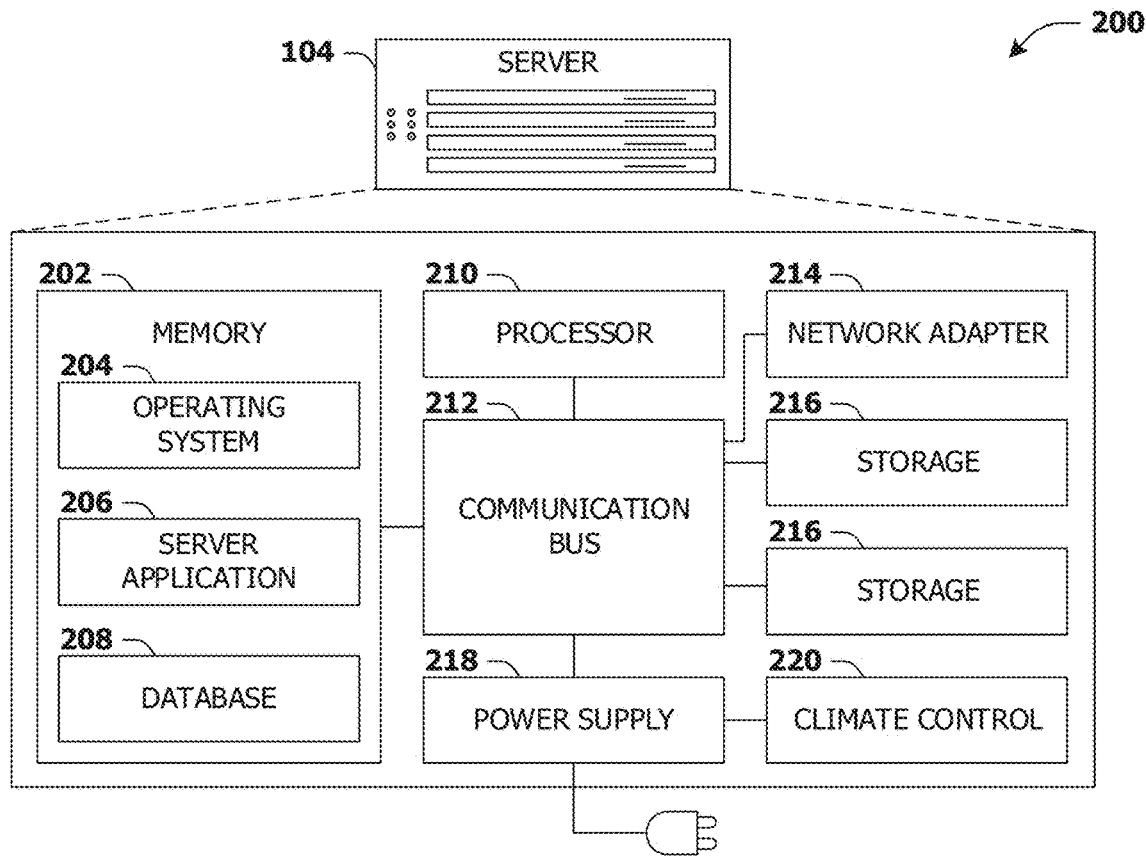
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
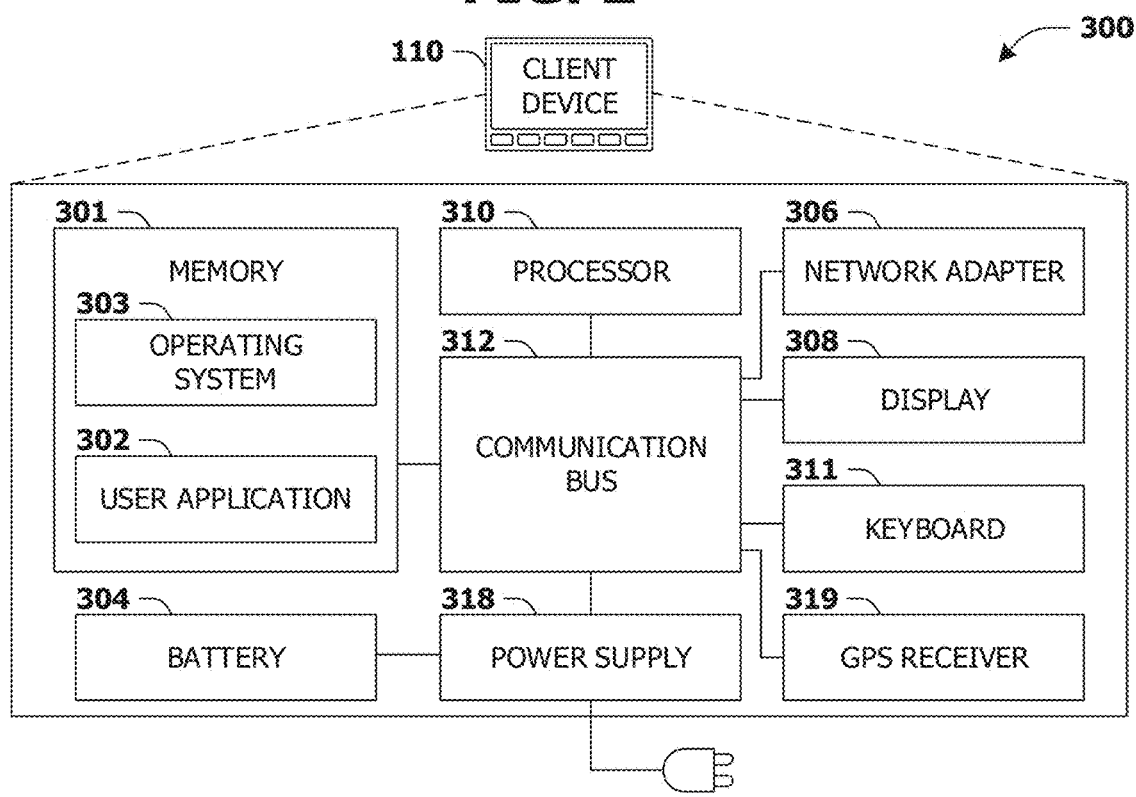
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for summarizing conversations are provided. For example, a user may be a member of a conversation (e.g., such as a group chat using an app, a group chat using an instant messaging service, a group chat using a text message service, a group chat using a social network, an email stream, etc.) with a plurality of users (e.g., members of the conversation). The user may want to view (e.g., and/or read) a plurality of messages of the conversation (e.g., an unread portion of the conversation, a skimmed portion of the conversation, a portion of the conversation that the user is interested in, etc.). Viewing (e.g., and/or reading) the plurality of messages may consume a significant amount of time and/or resources of the user (e.g., mental energy, attention, etc.). Thus, in accordance with one or more of the techniques presented herein, the conversation may be summarized (e.g., and/or shortened) to allow the user to attain an understanding of the plurality of messages by viewing a (e.g., graphical, audible and/or textual) summary. Consuming (e.g., reading, watching, listening to, etc.) the summary may require less time and/or resources (e.g., less mental energy, less attention, etc.) than viewing (e.g., and/or reading) the plurality of messages. Viewing the summary may also provide a pleasant (e.g., and/or entertaining) experience for the user.

Implementation of at least some of the disclosed subject matter may lead to benefits including, but not limited to, a reduction in screen space and/or an improved usability of a display (e.g., of a client device) (as a result of presenting an audible representation of a summary, as a result of presenting a graphical representation of the summary, as a result of presenting a textual representation of the summary, as a result of summarizing and/or shortening the portion of the conversation etc.). Alternatively and/or additionally, implementation of at least some of the disclosed subject matter may lead to benefits including a reduction in power consumption of a client device (e.g., as a result of presenting the audible representation of the summary, as a result of presenting the graphical representation of the summary, as a result of presenting the textual representation of the summary, as a result of summarizing and/or shortening the portion of the conversation, as a result of the user spending less time viewing the portion of the conversation due to the summarization of the portion of the conversation, as a result of a reduction of transmission and/or reception of data, etc.). Alternatively and/or additionally, implementation of at least some of the disclosed subject matter may lead to benefits including a reduction in bandwidth (e.g., as a result of summarizing and/or shortening the portion of the conversation, as a result of a reduction of transmission and/or reception of data, etc.). Alternatively and/or additionally, implementation of at least some of the disclosed subject matter may lead to benefits including an increase in speed and usability of the client device (e.g., as a result of a faster transmission speed of the summary as compared to a transmission of the portion of the conversation).

Further, implementation of at least some of the disclosed subject matter may lead to benefits for the user including, but not limited to, a reduction in time consumption for the user as a result of the summarization of the portion of the conversation and/or a reduction in mental energy and/or attention loads for the user by providing the user a more convenient method for understanding the portion of the conversation (e.g., the user may select an audible, graphical and/or textual summary based upon the user's convenience). Further, implementation of at least some of the disclosed subject matter may lead to benefits for the user including understanding one or more desired parts of the portion of the conversation using a summary (e.g., the summary accurately configured for the user based upon a user selection) without an inconvenience of having to consume undesired parts of the conversation.

Figure 4:
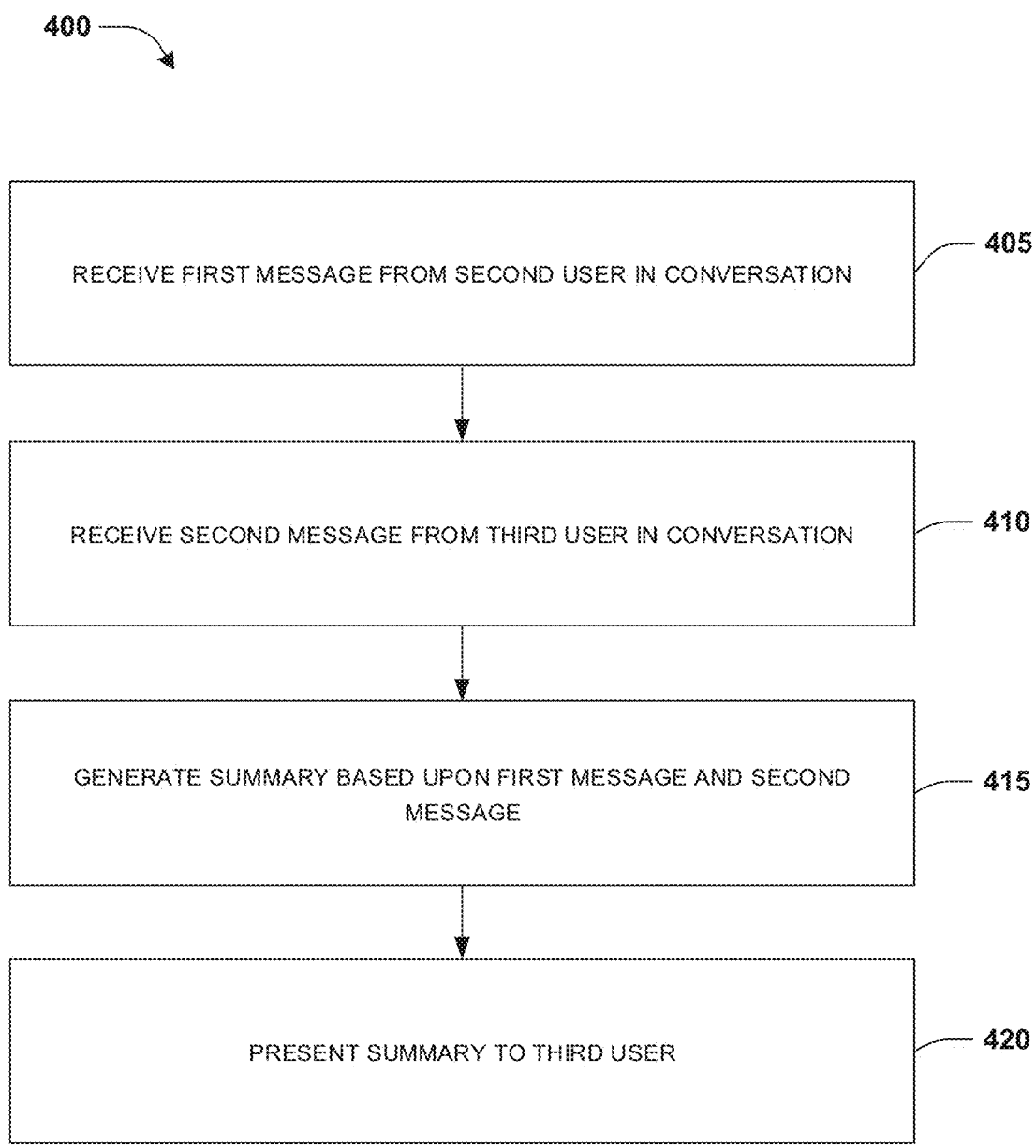
FIG. 4 is a flow chart illustrating an example method for generating a summary based upon a conversation.

An embodiment of generating a summary based upon a (e.g., group) conversation is illustrated by an example method 400 of FIG. 4. A user, such as user Jill, (e.g., and/or a client device) may access and/or interact with a service for sending and receiving messages, such as an instant messaging service, an email service, a social network, an app, etc. An account of the user with the service may be accessed and/or interacted with via one or more interfaces on the client device, such as a browser, an app, an email client, or another interface on the client device. The user may be a member of the conversation (e.g., such as a group chat using an app, a group chat using an instant messaging service, a group chat using a text message service, a group chat using a social network, an email stream, etc.) with a plurality of users (e.g., members of the conversation). Accordingly, at 405, a first message may be received (e.g., by a server and/or the client device) from a second user, such as user Andy (e.g., and/or a device associated with the second user) (e.g., via a browser, an app, an email client, a social network, an instant messaging service etc.), in the conversation. At 410, a second message may be received (e.g., by the server and/or the client device) from a third user, such as user Anne (e.g., and/or a device associated with the second user) (e.g., via a browser, an app, an email client, a social network, an instant messaging service etc.), in the conversation.

The user may want to view (e.g., and/or read) a plurality of messages of the conversation (e.g., an unread portion of the conversation, a skimmed portion of the conversation, a portion of the conversation that the user is interested in, etc.) comprising the first message and the second message. In some examples, however, viewing (e.g., and/or reading) the plurality of messages may consume a significant amount of time and/or resources of the user (e.g., depending upon an amount of messages and/or a size of messages). Accordingly, at 415, a summary based upon the first message and the second message may be generated (e.g., by the server and/or the client device). The server and/or the client device may generate the summary responsive to a determination that the user did not view (e.g., and/or read) the first message and the second message. Alternatively and/or additionally, the server and/or the client device may receive a user request to generate (e.g., and/or present) the summary from the user. In some examples, the server and/or the client device may generate the summary responsive to receiving the user request. The user request may be received via a conversational interface (e.g., a voice recognition and natural language interface), an interface comprising one or more buttons and/or a different type of interface.

In some examples, the summary may comprise a graphical representation of a combination of the first message and the second message. Alternatively and/or additionally, the summary may comprise a textual representation of the combination of the first message and the second message. Alternatively and/or additionally, the summary may comprise an audible representation of the combination of the first message and the second message. The server and/or the client device may combine the graphical representation, the textual representation and/or the audible representation to generate the summary.

The graphical representation may comprise (e.g., a combination of) a background scenery and/or an animation (e.g., overlaid on the background scenery). In some examples, the animation comprises a first visual representation (e.g., corresponding to the second user) and/or a second visual representation (e.g., corresponding to the third user). In other examples, the animation may comprise visual representations corresponding to (e.g., other) users in the conversation. The user may select the first visual representation and/or the second visual representation. Alternatively and/or additionally, the server and/or the client device may select the first visual representation (e.g., based upon user information corresponding to the second user, based upon a picture of the second user, based upon an age of the second user, based upon a gender of the second user, randomly, etc.) and/or the second visual representation (e.g., based upon user information corresponding to the third user, based upon a picture of the third user, based upon an age of the third user, based upon a gender of the third user, randomly, etc.).

The animation may portray content of the first message and the second message that the server and/or the client device deems significant. For example, the first visual representation and/or the second visual representation may act out the content (e.g., in such a way that the user understands the content).

The audible representation may comprise (e.g., a combination of) a background music, one or more sound effects and/or an audible narration. In some examples, the audible narration comprises a first audible user representation (e.g., corresponding to the second user) and/or a second audible user representation (e.g., corresponding to the third user). In other examples, the audible narration may comprise audible user representations corresponding to (e.g., other) users in the conversation. The user may select the first audible user representation (e.g., "Andy") and the second audible user representation (e.g., "Anne"). Alternatively and/or additionally, the server and/or the client device may select the first audible user representation (e.g., based upon a name of the second user, a username of the second user, a nickname of the second user, etc.) and/or the second audible user representation (e.g., based upon a name of the third user, a username of the third user, a nickname of the third user, etc.). The server and/or the client device may generate the one or more sound effects based upon the combination of the first message and the second message. For example, the server and/or the client device may generate a sound effect based upon a word and/or a phrase within the combination of the first message and the second message (e.g., generate a telephone ringing sound based upon an instance of a phrase, "she called me" or a word, "telephone"). In another example, the server and/or the client device may generate the sound effect based upon a symbol (e.g., an image, an emoji, etc.) within the combination of the first message and the second message (e.g., generate a telephone ringing sound based upon an image of a telephone or a telephone emoji).

The audible narration may present content of the first message and the second message that the server and/or the client device deems significant. For example, the server and/or the client device may generate the audible narration to narrate the content (e.g., in such a way that may provide the user with an understanding the content).

Alternatively and/or additionally, the audible representation may comprise (e.g., a combination of) a background music, one or more sound effects and/or a dialogue. In some examples, the server and/or the client device may generate the dialogue based upon the combination of the first message and the second message. In some examples, the dialogue may comprise a first dialogue part (e.g., corresponding to the second user) and/or a second dialogue part (e.g., corresponding to the third user).

The user may select a first voice (e.g., corresponding to the second user) for the first dialogue part and a second voice (e.g., corresponding to the third user) for the second dialogue part. The user may modify the first voice and the second voice (e.g., modify the first voice and/or the second voice to sound older/younger, modify the first voice and/or the second voice to sound higher/deeper, change an accent of the first voice and/or the second voice). The user may apply effects to the first voice and the second voice (e.g., echo effects, underwater effects, etc.). Alternatively and/or additionally, the server and/or the client device may select the first voice (e.g., based upon the user information corresponding to the second user, based upon an audio recording of the second user, based upon the age of the second user, based upon the gender of the second user, randomly, etc.) and/or the second voice (e.g., based upon user the information corresponding to the third user, based upon an audio recording of the third user, based upon the age of the third user, based upon the gender of the third user, randomly, etc.).

The dialogue may present content of the first message and the second message that the server and/or the client device deems significant. For example, the server and/or the client device may generate the dialogue to portray the content (e.g., in such a way that the user understands the content). In some examples, the server and/or the client device may analyze the first message (e.g., and/or content within the first message deemed significant) in order to determine a first emotion (e.g., excited, happy, bored, sad, mad, scared, etc.). The server and/or the client device may (e.g., then) generate the first dialogue part (e.g., and/or configure the first voice) based upon the first emotion. In some examples, the server and/or the client device may analyze the second message (e.g., and/or content within the second message deemed significant) in order to determine a second emotion (e.g., excited, happy, bored, sad, mad, scared, etc.). The server and/or the client device may (e.g., then) generate the second dialogue part (e.g., and/or configure the second voice) based upon the second emotion.

In examples where the audio recording of the second user (e.g., comprising a voice of the second user) is available to the server and/or the client device, the server and/or the client device may analyze the audio recording of the second user to generate the first dialogue part (e.g., and/or configure the first voice) based upon the voice of the second user. Similarly, in examples where the audio recording of the third user (e.g., comprising a voice of the third user) is available to the server and/or the client device, the server and/or the client device may analyze the audio recording of the third user to generate the second dialogue part (e.g., and/or configure the second voice) based upon the voice of the third user. In some examples, the server and/or the client device may generate the first dialogue part (e.g., and/or configure the first voice) based upon the first emotion and the voice of the second user. Similarly, the server and/or the client device may generate the second dialogue part (e.g., and/or configure the second voice) based upon the second emotion and the voice of the third user.

In some examples, the summary may comprise an abstractive summary. The server and/or the client device may generate the abstractive summary by shortening and/or summarizing content of the first message and the second message (e.g., and/or other messages) that the server and/or the client device deems significant. In an example, the server and/or the client device may apply natural language processing (NLP) to the first message to generate a first abstractive summary part. Similarly, the server and/or the client device may apply NLP to the second message to generate a second summary part. The server and/or the client device may (e.g., then) combine the first summary part and the second summary part to generate the abstractive summary. For example, the first message may be "Andy: Hey Anne, good morning! You should come to the meeting tomorrow." The second message may be "Anne: Hi Andy, how are you? Unfortunately, I'm busy tomorrow and can't make it." The server and/or the client device may generate the first abstractive summary part to be "Andy told Anne to attend tomorrow's meeting" and the second abstractive summary part to be "Anne said she can't make it." The server and/or the client device may combine the first summary part and the second summary part to generate the abstractive summary: "Andy told Anne to attend tomorrow's meeting. Anne said she can't make it."

Alternatively and/or additionally, the server and/or the client device may apply NLP to a combination of the first message and the second message (e.g., as a whole) to shorten and/or summarize (e.g., significant) content of the first message and the second message (e.g., and/or other messages) and to generate the abstractive summary. For example, the first message may be "Andy: Hey Anne, good morning! You should come to the meeting tomorrow." The second message may be "Anne: Hi Andy, how are you? Unfortunately, I'm busy tomorrow and can't make it." The server and/or the client device may generate the abstractive summary: "Andy told Anne to attend meeting tomorrow but Anne can't."

Alternatively and/or additionally, the summary may comprise an extractive summary. The server and/or the client device may generate the extractive summary by extracting one or more (e.g., verbatim) extracts from content of the first message and the second message (e.g., and/or other messages) that the server and/or the client device deems significant. In an example, the server and/or the client device may analyze the first message to identify a first (e.g., verbatim) extract (e.g., and/or one or more verbatim extracts). Similarly, the server and/or the client device may analyze the second message to identify a second (e.g., verbatim) extract (e.g., and/or one or more second verbatim extracts). The server and/or the client device may (e.g., then) combine the first (e.g., verbatim) extract and the second (e.g., verbatim) extract to generate the extractive summary. For example, the first message may be "Andy: Hey Anne, good morning! You should come to the meeting tomorrow." The second message may be "Anne: Hi Andy, how are you? Unfortunately, I'm busy tomorrow and can't make it". The server and/or the client device may analyze the first message to identify a first extract: "Anne," and a second extract: "come to the meeting". The server and/or the client device may analyze the second message to identify a third extract: "can't make it." The server and/or the client device may combine the first extract, the second extract and the third extract to generate the extractive summary: "Andy: Anne, . . . come to the meeting . . . Anne: . . . can't make it."

Alternatively and/or additionally, the server and/or the client device may analyze a combination of the first message and the second message (e.g., as a whole) to identify one or more extracts. For example, the first message may be "Andy: Hey Anne, good morning! You should come to the meeting tomorrow." The second message may be "Anne: Hi Andy, how are you? Unfortunately, I'm busy tomorrow and can't make it." The server and/or the client device may analyze the combination of the first message and the second message to identify the first extract, the second extract and the third extract. The server and/or the client device may combine the first extract, the second extract and the third extract to generate the extractive summary: "Andy: Anne, . . . come to the meeting . . . Anne: . . . can't make it."

In some examples, analyzing a combination of messages may involve (e.g., first) analyzing the combination to determine a context, and then analyzing each message (e.g., individually) based upon the context. For example, analyzing the combination of the first message and the second message may be performed to determine an invitation context. In the example, the first message may be analyzed based upon the invitation context (e.g., with a focus on attempting to identify language corresponding to an invitation and/or a response to an invitation) and the second message may be analyzed based upon the invitation context (e.g., with a focus on attempting to identify language corresponding to an invitation and/or a response to an invitation).

The summary may comprise a topic based summary. The topic based summary may comprise an automatically-selected-topic based summary. For example, the server and/or the client device may generate the topic based summary to portray content of the first message and the second message (e.g., and/or other messages) that the server and/or the client device deems significant (e.g., in such a way that may provide the user with a general (e.g., summarized) understanding of the first message and the second message). The server and/or the client device may use machine learning technology to analyze a time series to identify one or more significant (e.g., important) parts (e.g., and/or a beginning and ending of a significant part) of the first message and the second message (e.g., and/or other messages in a conversation) based upon a rate of activity per time. The server and/or the client device may analyze the first message and the second message (e.g., and/or other messages in the conversation) and determine a greater significance of the one or more significant parts in response to determining the one or more significant parts have a higher rate of activity per time than a rate of activity threshold. In some examples, the rate of activity threshold may be based upon the first message and the second message (e.g., and/or other messages). In some examples, messages within the plurality of messages may be compressed based upon times of the messages. For example, an old message corresponding to a first time (e.g., the old message received in the conversation at the first time) may be compressed more than a new message corresponding to a second time (e.g., the second time after the first time) (e.g., the new message received in the conversation at the second time).

Alternatively and/or additionally, the server and/or the client device may use information retrieval (IR) technology to determine a term frequency-inverse document frequency (TF-IDF) value (and/or one or more TF-IDF values) based upon a term (e.g., and/or one or more terms) within the first message and the second message (e.g., and/or other messages in a conversation). The server and/or the client device may determine that a topic (e.g., and/or one or more topics) is significant based upon the TF-IDF value (e.g., and/or the one or more TF-IDF values). The server and/or the client device may then generate the topic based summary to portray content corresponding to (e.g., and/or related to) the topic (e.g., and/or the one or more topics) (e.g., in such a way that may provide the user with an understanding the content of the conversation).

For example, the server and/or the client device may determine that a first topic is significant based upon a first TF-IDF value. The server and/or the client device may determine that a second topic is significant based upon a second TF-IDF value. The server and/or the client device may then generate the topic based summary to portray content corresponding to (e.g., and/or related to) the first topic and the second topic (e.g., in such a way that the user understands the content).

The topic based summary may comprise a user-selected-topic based summary. For example, the server and/or the client device may generate the topic based summary based upon a topic (e.g., and/or one or more topics) and/or a subtopic (e.g., and/or one or more subtopics) selected by the user (e.g., and/or received by the server and/or the client device from the user). In some examples, the server and/or the client device may generate a list of topics (e.g., comprising one or more topics and/or one or more subtopics) using IR technology. The user may (e.g., then) select one or more topics (e.g., and/or one or more subtopics) from the list of topics. The user may select the one or more topics (e.g., and/or the one or more subtopics) by using a conversational interface (e.g., a voice recognition and/or natural language interface), an interface comprising one or more buttons and/or a different type of interface. The server and/or the client device may then generate the topic based summary to portray content corresponding to the one or more topics (e.g., and/or the one or more subtopics) (e.g., in such a way that the user understands the content).

In an example, the server and/or the client device may generate a list of topics and subtopics based upon the conversation (e.g., comprising one or more messages from Jason, Anne and/or Andy):

1. Yesterday's meeting
  a. Attendance
  b. Opinions
  c. Contract
2. Dinner party next week
  a. Attendance
  b. Cake The user may select a first subtopic, Attendance, corresponding to a first topic, Yesterday's meeting, from the list of topics. The user may select a second topic, Dinner party next week, from the list of topics. The user may select the one or more topics (e.g., and/or the one or more subtopics) by using a conversational interface (e.g., a voice recognition and natural language interface), an interface comprising one or more buttons and/or a different type of interface. The server and/or the client device may (e.g., then) generate the topic based summary: "Jason, Anne and Andy attended yesterday's meeting. Jason and Anne plan to attend the dinner party and Anne will bring cake."

In some examples, similar statements within the plurality of messages may be compressed into a single statement. For example, statements of agreement (e.g., and/or statements of disagreement) may be compressed into a chorus of agreement (e.g., and/or a chorus of disagreement). In an example, a third message may be sent by a fourth user, such as user Jason, in the conversation: "That was a difficult test, right?" A first number of users (e.g., 47 users) may send statements expressing agreement with the third message. A second number of users (e.g., 32 users) may send statements expressing disagreement with the third message. Accordingly, the server and/or the client device may compress the statements expressing agreement to generate a first single statement: "47 users agree". The server and/or the client device may compress the statements expressing disagreement to generate a second single statement: "32 users disagree". The server and/or the client device may combine the third message, the first single statement and the second single statement to generate the topic based summary: "Jason said the test was difficult; 47 users agree and 32 users disagree."

The summary may comprise a user based summary. For example, the server and/or the client device may generate the user based summary based upon activity related to a specific user. The specific user may be based upon a user identification selected by the user (e.g., and/or received by the server and/or the client device from the user). The activity may comprise activity of the specific user and/or activity (e.g., of one or more other users) related to the specific user. In some examples, the server and/or the client device may determine one or more significant parts of the activity related to the specific user using IR technology, analyzing one or more TF-IDF values and/or one or more rates of activity per time, identifying atypical vocabulary and/or filtering activity determined to be irrelevant (e.g., good-morning, hello, goodbye, etc.). The server and/or the client device may generate the user based summary to portray the one or more significant parts (e.g., in such a way that the user understands the one or more significant parts).

For example, the second user may be invited to the conversation by the third user. The second user may (e.g., then) enter the conversation. The second user may (e.g., then) send the first message "Andy: Hey Anne, good morning! You should come to the meeting tomorrow." The second message (e.g., sent by the third user) may be "Anne: Hi Andy, how are you? Unfortunately, I'm busy tomorrow and can't make it", the third message (e.g., sent by the fourth user) may be "Jason: That was a difficult test, right?" and a fourth message, sent by the second user may be "Andy: Yeah it was hard!" The second user may (e.g., then) leave the conversation. The user may select a user identification, "Andy", corresponding to the second user. The user may select the user identification by using a conversational interface (e.g., a voice recognition and natural language interface), an interface comprising one or more buttons and/or a different type of interface. The server and/or the client device may then generate the user based summary: "Andy was invited to the conversation by Anne. Andy accepted. Andy told Anne to attend the meeting tomorrow but Anne can't. Andy agreed with Jason that the test was hard. Andy left the conversation."

The summary may comprise a set-of-users based summary. For example, the server and/or the client device may generate the set-of-users based summary based upon activity related to a plurality of users. The plurality of users may be based upon a plurality of user identifications selected by the user (e.g., and/or received by the server and/or the client device from the user). The activity may comprise activity of the plurality of users and/or activity (e.g., of one or more users) related to the plurality of users. In some examples, the server and/or the client device may determine one or more significant parts of the activity related to the plurality of users by using IR technology, by analyzing one or more TF-IDF values and/or one or more rates of activity per time, by identifying atypical vocabulary and/or by filtering activity determined to be irrelevant (e.g., good-morning, hello, goodbye, etc.). The server and/or the client device may generate the set-of-users based summary to portray the one or more significant parts (e.g., in such a way that the user understands the one or more significant parts).

For example, the second user may be invited to the conversation by the third user. The second user may (e.g., then) enter the conversation. The second user may (e.g., then) send the first message "Andy: Hey Anne, good morning! You should come to the meeting tomorrow." The second message (e.g., sent by the third user) may be "Anne: Hi Andy, how are you? Unfortunately, I'm busy tomorrow and can't make it", the third message (e.g., sent by the fourth user) may be "Jason: That was a difficult test, right?" and a fourth message, sent by the second user may be "Andy: Yeah it was hard!" The second user may (e.g., then) leave the conversation. The user may select a first user identification, "Andy", corresponding to the second user, and a second user identification, "Jason", corresponding to the fourth user. The user may select the first user identification and/or the second user identification by using a conversational interface (e.g., a voice recognition and natural language interface), an interface comprising one or more buttons and/or a different type of interface. The server and/or the client device may then generate the user based summary: "Andy was invited to the conversation by Anne. Andy accepted. Andy told Anne to attend meeting tomorrow but Anne can't. Jason said the test was difficult. Andy agreed. Andy left the conversation."

The summary may comprise a membership based summary. For example, the server and/or the client device may generate the membership based summary based upon one or more membership statuses (e.g., corresponding to one or more users) and/or changes to the one or more membership statuses. The one or more users may be based upon one or more user identifications selected by the user (e.g., and/or received by the server and/or the device from the user). In some examples, the server and/or the client device may determine the one or more membership statues and/or changes to the one or more statuses by analyzing inactivity of the one or more users, by analyzing activity of the one or more users, by analyzing atypical activity of the one or more users, by identifying when a rate of activity per time of the one or more users increases and/or decreases, by identifying an exclusion (e.g., and/or deletion from the group) of one of the one or more users and/or an inclusion (e.g., and/or addition to the group) of one of the one or more users, by analyzing a membership (e.g., group) dynamic of the one or more users and/or by filtering out activity and/or changes to the one or more membership statuses determined to be irrelevant. The server and/or the client device may generate the membership based summary to portray content of the one or more membership statuses and/or changes to the one or more membership statuses that the server and/or the client device deems significant.

For example, the second user may be invited to the conversation by the third user at a first time. The second user may (e.g., then) enter the conversation. The second user may have a first membership status (e.g., Last seen recently). The second user may (e.g., then) have a first rate of activity per time (e.g., 40 to 60 messages sent per day) for a first amount of time (e.g., two days). The second user may (e.g., then) have a second rate of activity per time (e.g., 10 to 30 messages sent per day) for a second amount of time (e.g., three days). The second user may (e.g., then) have no activity (e.g., send 0 messages) for a third amount of time (e.g., seven days). A membership status of the second user may (e.g., then) change from the first membership status to a second membership status (e.g., Last seen over a week ago). The second user may (e.g., then) leave the conversation at a second time (e.g., 14 days after the first time). The user may select a user identification, "Andy", corresponding to the second user at a third time (e.g. 15 days after the first time). The user may select the user identification by using a conversational interface (e.g., a voice recognition and natural language interface), an interface comprising one or more buttons and/or a different type of interface. The server and/or the client device may then generate the membership based summary: "Andy was invited by Jason over two weeks ago. Andy's status was Last seen recently. Andy was very active for two days (about 50 messages per day). Then Andy's activity decreased to moderately active for three days (about 20 messages per day). Then Andy didn't send any messages or check the conversation for a week. Andy's status changed to Last seen over a week ago. Andy left the conversation yesterday."

In some examples, the server and/or the client device may receive a user request to present (e.g., and/or generate) the summary from the user. The user request may be received via a conversational interface (e.g., a voice recognition and natural language interface), an interface comprising one or more buttons and/or a different type of interface. The user request may comprise a user selection comprising one or more summary types (e.g., a graphical representation, a textual representation, an audible representation, an abstractive summary, an extractive summary, an automatically-selected-topic based summary, a user-selected-topic based summary, a user based summary, a set-of-users based summary and/or a membership based summary) and/or one or more settings (e.g., parameters) (e.g., a background scenery, one or more visual representations, a background music, one or more audible user representations, one or more voices, one or more topics and/or one or more subtopics, one or more user identifications and/or a time period of messages to summarize).

At 420, the server and/or the client device may (e.g., then) present the summary to the user. In some examples, the server and/or the client device may present the summary on a screen of the client device (e.g., using a social network, an instant messaging service, an app, a browser etc.). Alternatively and/or additionally, the server and/or the client device may send the summary to the user via an app, an email client, a social network, an instant messaging service and/or a text message service.

In some examples, the user may modify the summary. The user may save and/or store the summary. The user may share the summary using an app, an email client a social network, an instant messaging service, etc. Accordingly, the user may send the summary to one or more users (e.g., one or more members) in the conversation and/or one or more users (e.g., one or more non-members) not in the conversation.

Figure 5:
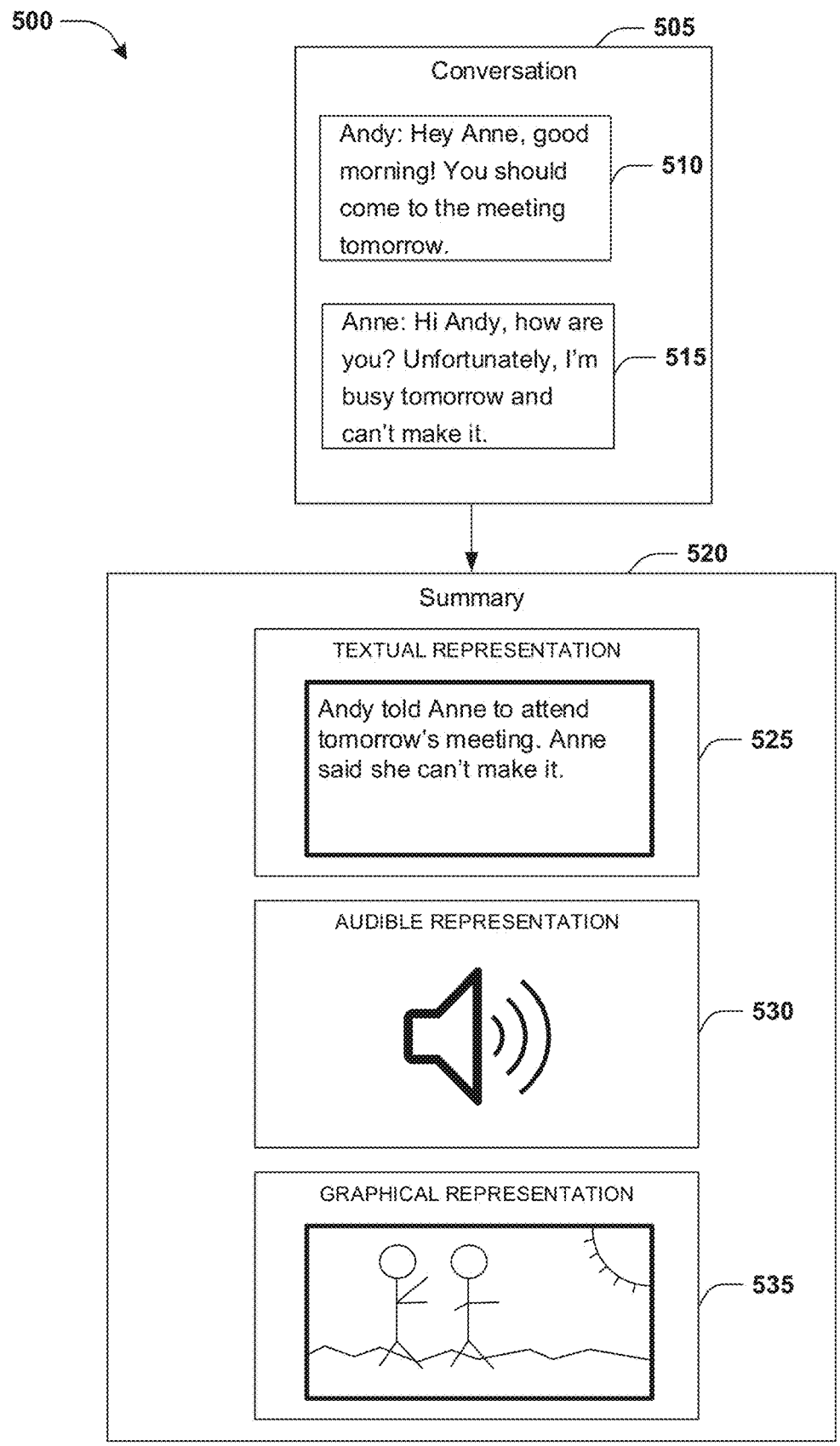
FIG. 5 is a component block diagram illustrating an example system for summarizing a conversation.

FIG. 5 illustrates a system 500 for summarizing a conversation 505. In some examples, a user, such as user Jill, (e.g., and/or a client device of the user) may access and/or interact with a service for sending and receiving messages. The user may be a part of a (e.g., group) conversation 505 (e.g., such as a group chat using an app, a group chat using an instant messaging service, a group chat using a text message service, a group chat using a social network, an email stream, etc.). Accordingly, the user may receive one or more messages from one or more users (e.g., and/or one or more devices associated with the one or more users) in the conversation 505.

In an example, the user may receive a first message 510 from a second user, user Andy, (e.g., and/or a device associated with the second user) in the conversation 505. Similarly, the user may receive a second message 515 from a third user, user Anne, (e.g., and/or a device associated with the third user) in the conversation 505. A server and/or a client device may generate a summary 520 based upon the conversation 505. The server and/or the client device may generate the summary 520 responsive to a determination that the user did not view (e.g., and/or read) at least a portion of the conversation 505 (e.g., the first message 510 and the second message 515). Alternatively and/or additionally, the server and/or the client device may receive a user request to generate the summary 520 from the user. In some examples, the server and/or the client device may generate the summary 520 responsive to receiving the user request. The user request may be received via a conversational interface (e.g., a voice recognition and natural language interface), an interface comprising one or more buttons and/or a different type of interface.

In some examples, the summary 520 may comprise a textual representation 525, an audible representation 530 and/or a graphical representation 535. For example, the summary 520 may comprise (e.g., one of) the textual representation 525, the audible representation 530 or the graphical representation 535. Alternatively and/or additionally, the summary 520 may comprise a combination of (e.g., each of) the textual representation 525, the audible representation 530 and the graphical representation 535. Alternatively and/or additionally, the summary 520 may comprise a combination of two of the textual representation 525, the audible representation 530 and the graphical representation 535.

In some examples, the summary 520 may be based upon the user request. For example, the summary 520 may be based upon a user selection (e.g., comprised within the user request) comprising one or more summary types (e.g., the textual representation 525, the audible representation 530 or the graphical representation 535, an abstractive summary, an extractive summary, an automatically-selected-topic based summary, a user-selected-topic based summary, a user based summary, a set-of-users based summary and/or a membership based summary) and/or one or more settings (e.g., parameters) (e.g., a background scenery, one or more visual representations, background music, one or more audible user representations, one or more voices, one or more topics and/or subtopics, one or more user identifications and/or a time period of messages to summarize).

In some examples, (e.g., all of) the one or more summary types and the one or more settings may be determined by the server and/or the client device. Alternatively and/or additionally, (e.g., all of) the one or more summary types and the one or more settings may be specified by the user selection (e.g., selected by the user). Alternatively and/or additionally, at least some of the one or more summary types and the one or more settings may be determined by the server and/or the client device and at least some of the one or more summary types and the one or more settings may be specified by the user selection (e.g., selected by the user).

In an example, the summary 520 may comprise the textual representation 525 comprising an abstractive summary (e.g., of the first message 510 and the second message 515) corresponding to a time period encompassing the first message 510 and the second message 515. Accordingly, the server and/or the client device may apply NLP to the first message and the second message to generate the abstractive summary to portray content of the first message and the second message that the server and/or the client device deems significant (e.g., in such a way that the user may be provided with a general understanding of the first message and the second message).

In another example, the summary 520 may comprise the audible representation 530 comprising an abstractive summary (e.g., of the first message 510 and the second message 515) corresponding to a time period encompassing the first message 510 and the second message 515. In some examples, the user selection may specify that a first audible user representation, corresponding to the second user, is "Andy" and/or a second audible user representation, corresponding to the third user, is "Anne". Alternatively and/or additionally, the server and/or the client device may select the first audible user representation, "Andy", based upon a name of the second user, a username of the second user, a nickname of the second user, etc. and/or the server and/or the client device may select the second audible user representation, "Anne", based upon a name of the third user, a username of the third user, a nickname of the third user, etc. Accordingly, the server and/or the client device may apply NLP to the first message and the second message to generate the abstractive summary to portray content of the first message and the second message that the server and/or the client device deems significant (e.g., in such a way that the user may be provided with a general understanding of the first message and the second message).

In another example, the summary 520 may comprise the graphical representation 535 corresponding to a time period encompassing the first message 510 and the second message 515. In some examples, the user selection may specify a first visual representation (e.g., a first avatar) corresponding to the second user and/or a second visual representation (e.g., a second avatar) corresponding to the third user. Alternatively and/or additionally, the server and/or the client device may select the first visual representation (e.g., based upon user information corresponding to the second user, based upon a picture of the second user, based upon an age of the second user, based upon a gender of the second user, randomly, etc.) and/or the second visual representation (e.g., based upon user information corresponding to the third user, based upon a picture of the third user, based upon an age of the third user, based upon a gender of the third user, randomly, etc.). In some examples, the user selection may specify a background scenery of the graphical representation 535. Alternatively and/or additionally, the server and/or the client device may select the background scenery (e.g., based upon a context of the conversation, one or more members of the conversation, etc.). Accordingly, the server and/or the client device may generate the graphical representation 535 comprising an animation wherein the first visual representation and the second visual representation may act out content that the server and/or the client device deems significant (e.g., in such a way that the user may be provided with a general understanding of the first message and the second message).

Figure 6A:
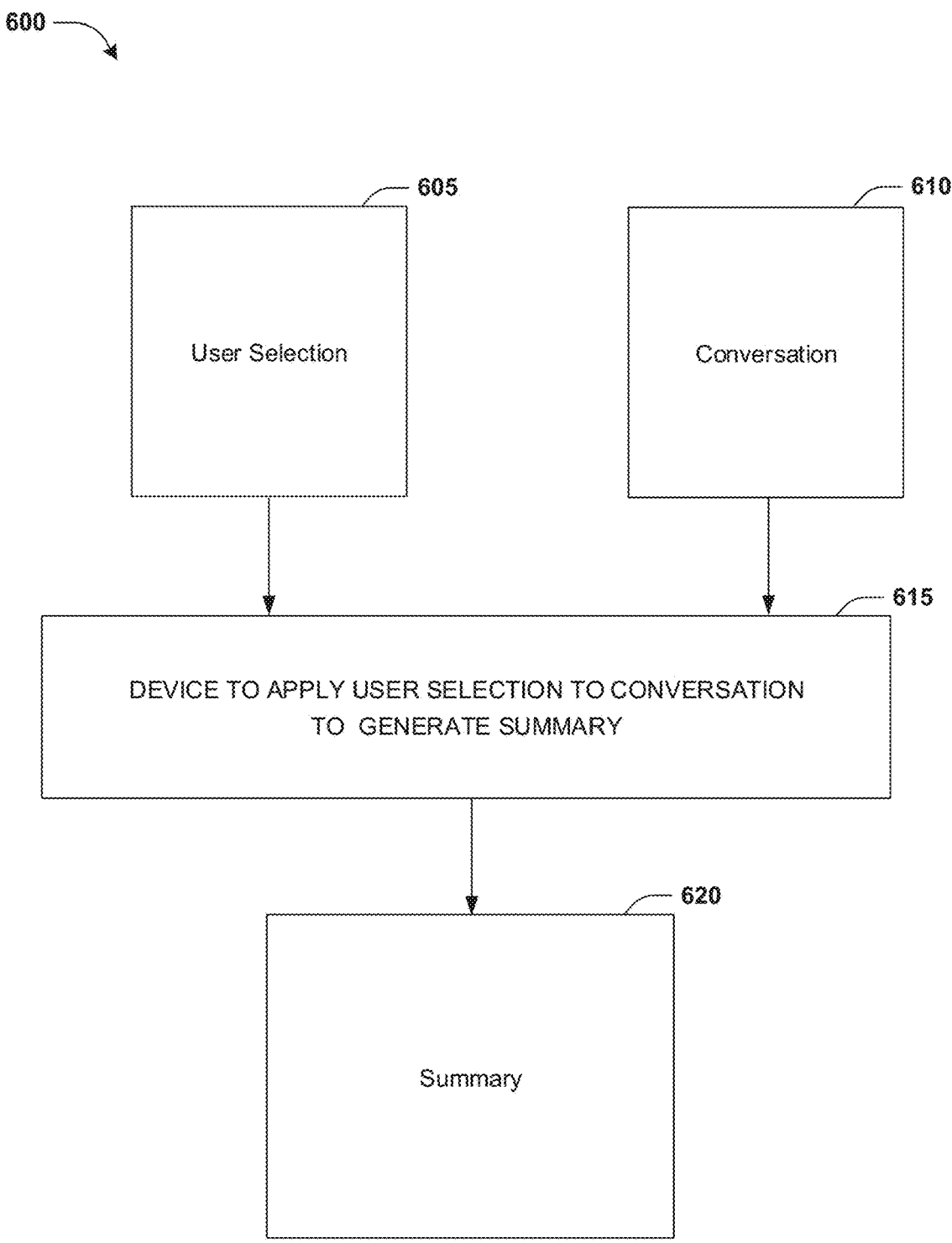
FIG. 6A is a component block diagram illustrating an example system for generating a summary 620 based upon a conversation and a user selection.

FIG. 6A illustrates a system 600 for generating a summary 620 based upon a (e.g., group) conversation 610 and a user selection 605. In some examples, a user, such as user Jill, (e.g., and/or a client device of the user) may access and/or interact with a service for sending and receiving messages. The user may be a member of the conversation 610 (e.g., such as a group chat using an app, a group chat using an instant messaging service, a group chat using a text message service, a group chat using a social network, an email stream, etc.). Accordingly, the user may receive one or more messages from one or more users (e.g., and/or one or more devices associated with the one or more users) in the conversation 610.

A device 615 (e.g., comprising a server and/or a client device of the user) may generate the summary 620 based upon the user selection 605 and the conversation 610. The device 615 may generate the summary 620 responsive to a determination that the user did not view (e.g., and/or read) at least a portion of the conversation 610. Alternatively and/or additionally, the device 615 may receive a user request to generate (e.g., and/or present) the summary 620 from the user. In some examples, the device 615 may generate the summary 620 responsive to receiving the user request.

Figure 6B:
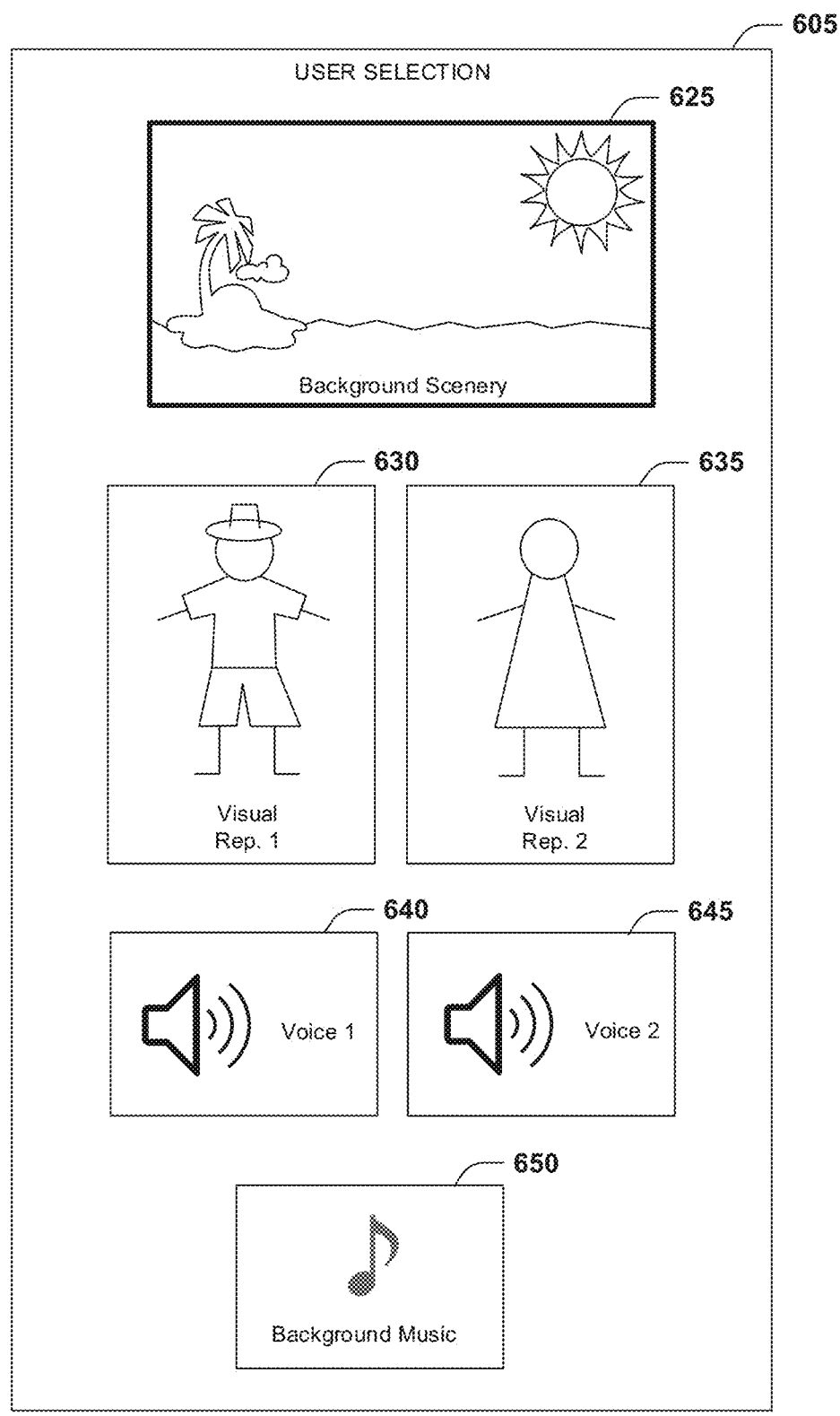
FIG. 6B is a component block diagram illustrating an example user selection comprising one or more settings such as a background scenery, a first visual representation corresponding to a second user, a second visual representation corresponding to a third user, a first voice corresponding to the second user, a second voice corresponding to the third user and/or a background music.

In some examples, the user request may comprise the user selection 605, further illustrated in FIG. 6B. The user selection 605 may comprise one or more summary types (e.g., a textual representation, an audible representation, a graphical representation, an abstractive summary, an extractive summary, an automatically-selected-topic based summary, a user-selected-topic based summary, a user based summary, a set-of-users based summary and/or a membership based summary) and/or one or more settings (e.g., parameters) (e.g., a background scenery, one or more visual representations, background music, one or more audible user representations, one or more voices, one or more topics and/or subtopics, one or more user identifications and/or a time period of messages to summarize).

In some examples, (e.g., all of) the one or more summary types and the one or more settings may be determined by the device 615. Alternatively and/or additionally, (e.g., all of) the one or more summary types and the one or more settings may be specified by the user selection 605. Alternatively and/or additionally, at least some of the one or more summary types and the one or more settings may be determined by the device 615 and at least some of the one or more summary types and the one or more settings may be specified by the user selection 605 (e.g., selected by the user).

In an example, the user selection 605 may specify that the summary 620 comprises a graphical representation comprising a background scenery 625, a first visual representation 630 corresponding to a second user and/or a second visual representation 635 corresponding to a third user. The user selection 605 may further specify that the summary 620 comprises an audible representation comprising a first voice 640 corresponding to the second user, a second voice 645 corresponding to the third user and/or a background music 650.

Figure 6C:
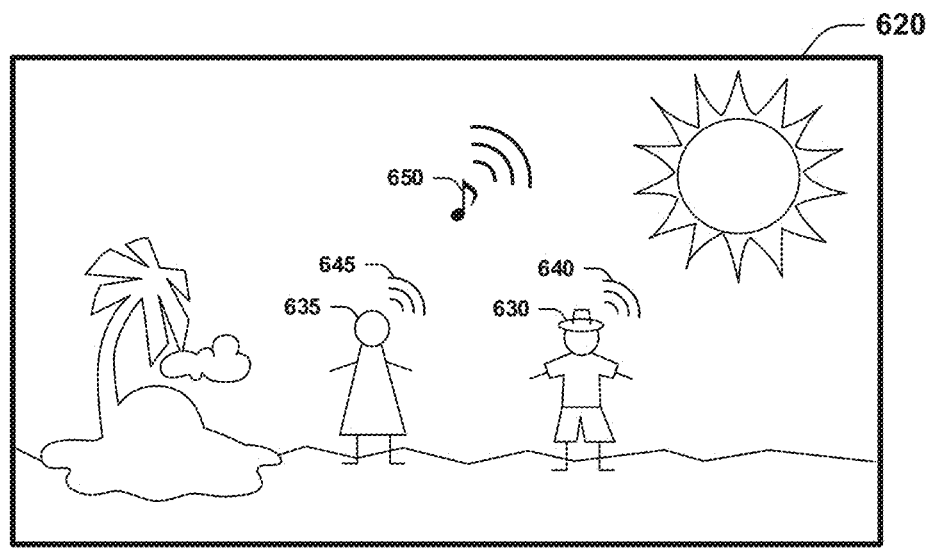
FIG. 6C is a component block diagram illustrating an example summary based upon a user selection.

The summary 620, further illustrated in FIG. 6C, may comprise an animation and a dialogue presenting content of the conversation 610 that the device 615 deems significant. For example, the animation may comprise the first visual representation 630 and the second visual representation acting out the content, overlaid on the background scenery 625. The dialogue may comprise a first dialogue part (e.g., corresponding to the second user) and a second dialogue part (e.g., corresponding to the third user). The first dialogue part may be configured using the first voice 640 and the second dialogue part may be configured using the second voice 645. The animation may be synchronized with the dialogue. The background music 650 may be configured to play throughout the animation and the dialogue.

Figure 7:
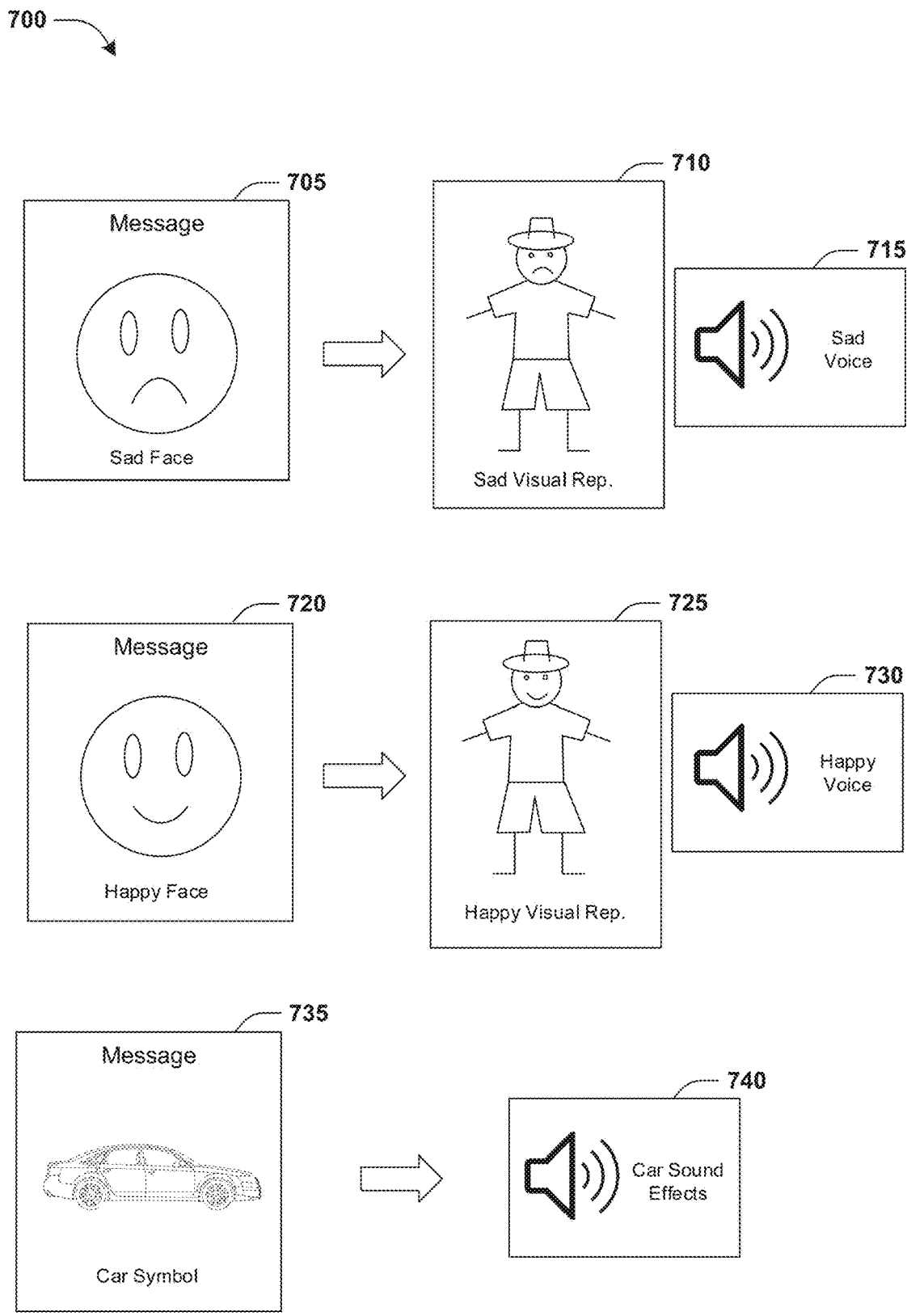
FIG. 7 is a component block diagram illustrating an example system for summarizing a conversation wherein a server and/or a client device may analyze a message to determine an emotion and generate a visual representation and/or a voice based upon an emotion and the server and/or the client device may analyze a message to generate a sound effect based upon a word, a phrase and/or a symbol.

FIG. 7 illustrates a system 700 for summarizing a conversation. In some examples, a server and/or a client device of a user may analyze a message 705 to determine a first emotion (e.g., excited, happy, bored, sad, mad, scared, etc.). For example, the server and/or the client device may determine a sad emotion based upon a word, a phrase and/or a symbol (e.g., an image, an emoji, etc.) within the message 705. Responsive to determining the sad emotion, the server and/or the client device may generate a sad visual representation 710 (e.g., portraying a sad emotion) and/or may generate a dialogue part using a sad voice 715 (e.g., portraying a sad emotion).

Similarly, the server and/or the client device may analyze a message 720 to determine a second emotion (e.g., excited, happy, bored, sad, mad, scared, etc.). For example, the server and/or the client device may determine a happy emotion based upon a word, a phrase and/or a symbol (e.g., an image, an emoji, etc.) within the message 720. Responsive to determining the happy emotion, the server and/or the client device may generate a happy visual representation 725 (e.g., portraying a happy emotion) and/or may generate a dialogue part using a happy voice 730 (e.g., portraying a happy emotion).

The server and/or the client device may analyze a message 735 to generate one or more sound effects. For example, the server and/or the client device may generate a car sound effect 740 based upon a word, a phrase and/or a symbol (e.g., an image, an emoji, etc.) within the message 735. The server and/or the client device may (e.g., then) generate a summary comprising the sad visual representation 710, the sad voice 715, the happy visual representation 725, the happy voice 730 and/or the car sound effect 740.

It may be appreciated that the disclosed subject matter may assist a user (e.g., and/or the device associated with the user) in attaining an understanding of at least a portion of a (e.g., group) conversation (e.g., such as a group chat using an app, a group chat using an instant messaging service, a group chat using a text message service, a group chat using a social network, an email stream, etc.) with a plurality of users (e.g., members of the conversation).

In some examples, at least some of the disclosed subject matter may be implemented on a client device, and in some examples, at least some of the disclosed subject matter may be implemented on a server (e.g., hosting a service accessible via a network, such as the Internet).

Figure 8:
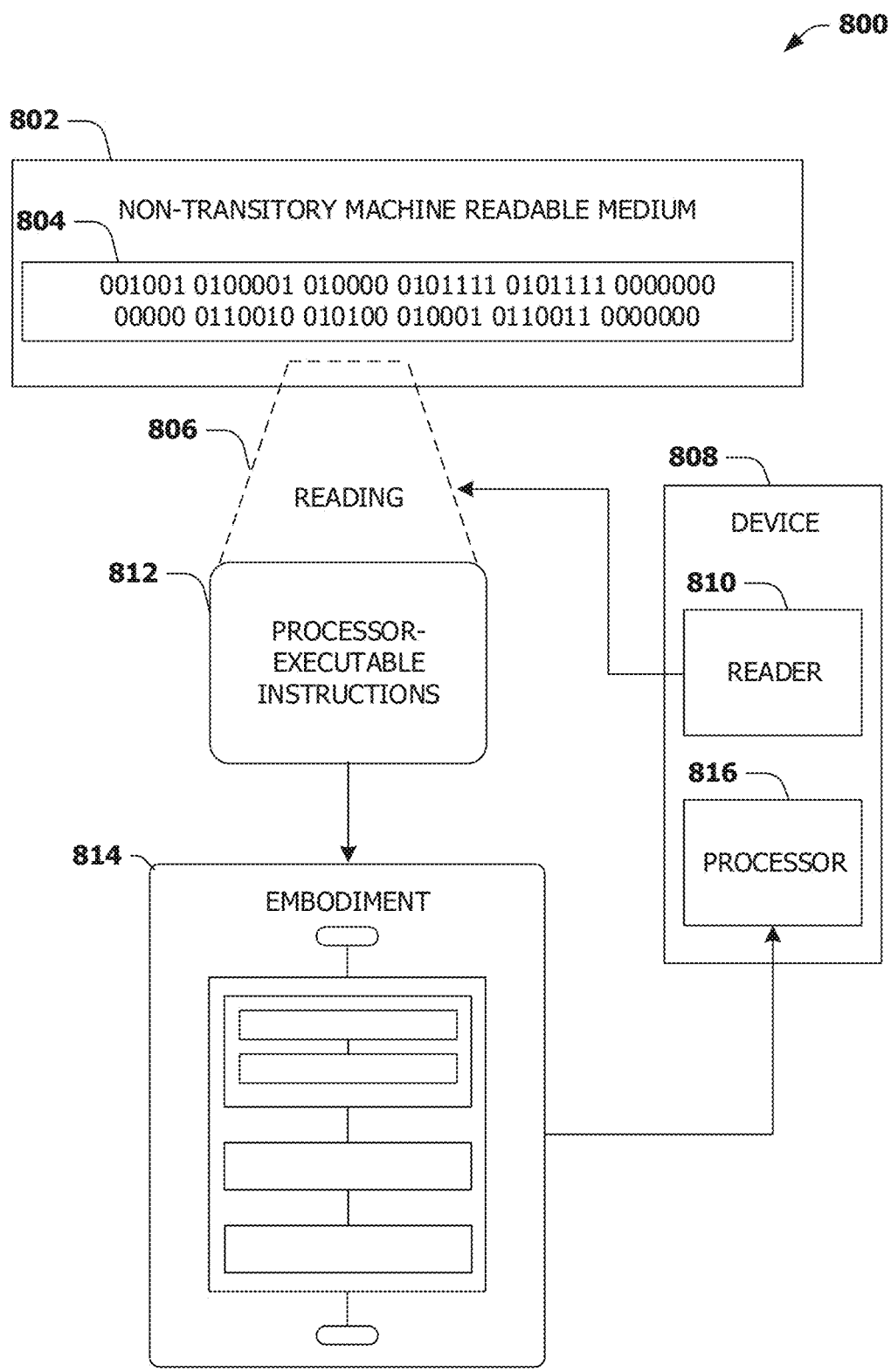
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein (e.g., embodiment 814). The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed, cause performance of operations, such as at least some of the example method 400 of FIG. 4, for example. In some embodiments, the processor-executable instructions 812 are configured to cause implementation of a system, such as at least some of the example system 500 of FIG. 5, the example system 600 of FIGS. 6A-6C and/or the example system 700 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for summarization of a conversation, comprising:
   receiving, via a processor, a first electronic message, in a conversation, from a first user;
   receiving, via the processor, a second electronic message, in the conversation, from a second user;
   determining, via the processor, a first user identification corresponding to the first user;
   determining, via the processor, a second user identification corresponding to the second user;
   based upon the first user identification, analyzing, via the processor, first user activity, of the first user, associated with the conversation to generate a first membership status summary of the first user;
   based upon the second user identification, analyzing, via the processor, second user activity, of the second user, associated with the conversation to generate a second membership status summary of the second user;
   generating, via the processor, a summary based upon the first membership status summary and the second membership status summary; and
   presenting, to a third user, the summary.

2. The method of claim 1, the summary generated responsive to at least one of:
   a determination that the third user did not view the first electronic message and the second electronic message; or
   a user request by the third user.

3. The method of claim 1, the summary comprising at least one of:
   a graphical representation of a combination of the first electronic message and the second electronic message;
   a textual representation of the combination of the first electronic message and the second electronic message; or
   an audible representation of the combination of the first electronic message and the second electronic message.

4. The method of claim 3, comprising:
   generating a first visual representation of the first user;
   generating a second visual representation of the second user; and
   generating an animation, for the graphical representation, based upon the first visual representation, the second visual representation and the combination of the first electronic message and the second electronic message.

5. The method of claim 3, comprising:
   generating a first audible user representation of the first user;
   generating a second audible user representation of the second user; and
   generating an audible narration of the combination of the first electronic message and the second electronic message, for the audible representation, based upon the first audible user representation, the second audible user representation and the combination of the first electronic message and the second electronic message.

6. The method of claim 3, comprising:
   generating a dialogue, for the audible representation, based upon the combination of the first electronic message and the second electronic message.

7. The method of claim 6, comprising:
   analyzing the first electronic message to determine a first emotion;
   analyzing the second electronic message to determine a second emotion;
   analyzing a first voice of the first user;
   analyzing a second voice of the second user;
   generating a first dialogue part, corresponding to the first user, based upon the first electronic message and at least one of the first emotion or the first voice;
   generating a second dialogue part, corresponding to the second user, based upon the second electronic message and at least one of the second emotion or the second voice; and
   combining the first dialogue part and the second dialogue part to generate the dialogue.

8. The method of claim 3, comprising:
   combining at least two of the graphical representation, the textual representation or the audible representation to generate the summary.

9. The method of claim 1, the summary generated based upon a summary type specified by the third user.

10. The method of claim 1, wherein the summary comprises an abstractive summary, the method comprising:
    applying natural language processing to the first electronic message to generate a first abstractive summary part;
    applying natural language processing to the second electronic message to generate a second abstractive summary part; and
    combining the first abstractive summary part and the second abstractive summary part to generate the abstractive summary.

11. The method of claim 1, wherein the summary comprises an extractive summary, the method comprising:
    analyzing the first electronic message to identify a first verbatim extract;
    analyzing the second electronic message to identify a second verbatim extract; and
    combining the first verbatim extract and the second verbatim extract to generate the extractive summary.

12. The method of claim 1, wherein the summary comprises a topic based summary, the method comprising:
    determining a term frequency-inverse document frequency value based upon a combination of the first electronic message and the second electronic message;
    determining a topic based upon the term frequency-inverse document frequency value; and
    generating the topic based summary based upon the topic and the combination of the first electronic message and the second electronic message.

13. The method of claim 1, wherein the summary comprises a topic based summary, the method comprising:
    receiving a topic from the third user; and
    generating the topic based summary based upon the topic and a combination of the first electronic message and the second electronic message.

14. The method of claim 1, wherein the summary comprises a user based summary, the method comprising:
    receiving a user identification, corresponding to a user, from the third user;
    analyzing the conversation to determine activity related to the user; and generating the user based summary based upon the activity related to the user.

15. A computing device comprising:
a processor; and
memory comprising processor-executable instructions that when executed by the processor cause performance of operations, the operations comprising:
receiving a first electronic message, in a conversation, from a first user;
receiving a second electronic message, in the conversation, from a second user;
determining a first user identification corresponding to the first user;
determining a second user identification corresponding to the second user;
based upon the first user identification, analyzing first user activity, of the first user, associated with the conversation to generate a first membership status summary of the first user;
based upon the second user identification, analyzing second user activity, of the second user, associated with the conversation to generate a second membership status summary of the second user;
generating a summary based upon the first membership status summary and the second membership status summary; and
presenting, to a third user, the summary.

16. The computing device of claim 15, the summary generated responsive to at least one of:
a determination that the third user did not view the first electronic message and the second electronic message; or
a user request by the third user.

17. A non-transitory machine readable medium having stored thereon processor-executable instructions that when executed cause performance of operations, the operations comprising:
receiving, via a processor, a first electronic message, in a conversation, from a first user;
receiving, via the processor, a second electronic message, in the conversation, from a second user;
determining, via the processor, a first user identification corresponding to the first user;
determining, via the processor, a second user identification corresponding to the second user;
based upon the first user identification, analyzing, via the processor, first user activity, of the first user, associated with the conversation to generate a first membership status summary of the first user;
based upon the second user identification, analyzing, via the processor, second user activity, of the second user, associated with the conversation to generate a second membership status summary of the second user;
generating, via the processor, a summary based upon the first membership status summary and the second membership status summary; and
presenting, to a third user, the summary.

18. The non-transitory machine readable medium of claim 17, the summary comprising:
a graphical representation of a combination of the first electronic message and the second electronic message.

19. The non-transitory machine readable medium of claim 17, the summary comprising:
a textual representation of a combination of the first electronic message and the second electronic message.

20. The non-transitory machine readable medium of claim 17, the summary comprising:
an audible representation of a combination of the first electronic message and the second electronic message.

* * * * *